US009444657B2

(12) United States Patent
Chen et al.

(10) Patent No.: US 9,444,657 B2
(45) Date of Patent: Sep. 13, 2016

(54) DYNAMICALLY CALIBRATING THE OFFSET OF A RECEIVER WITH A DECISION FEEDBACK EQUALIZER (DFE) WHILE PERFORMING DATA TRANSPORT OPERATIONS

(71) Applicant: INTERNATIONAL BUSINESS MACHINES CORPORATION, Armonk, NY (US)

(72) Inventors: Minhan Chen, Cary, NC (US); Jieming Qi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 13/938,260

(22) Filed: Jul. 10, 2013

(65) Prior Publication Data
US 2015/0019770 A1    Jan. 15, 2015

(51) Int. Cl.
*H03H 7/30* (2006.01)
*H04L 25/03* (2006.01)

(52) U.S. Cl.
CPC .............................. *H04L 25/03057* (2013.01)

(58) Field of Classification Search
CPC ........... H04L 25/03885; H04L 25/063; H04L 2025/0349; H04L 25/085; H04L 25/03057; H04L 2025/03617; H03H 15/00; H03M 1/0607
USPC .......... 375/229, 230, 232, 233; 333/18, 28 R
See application file for complete search history.

(56) References Cited

U.S. PATENT DOCUMENTS

| | | | |
|---|---|---|---|
| 6,897,700 B1 | 5/2005 | Fu et al. | |
| 7,233,164 B2 | 6/2007 | Stojanovic et al. | |
| 7,321,259 B1 | 1/2008 | Shumarayev | |
| 7,368,999 B2 | 5/2008 | Natzke | |
| 7,586,983 B1 | 9/2009 | Shumarayev et al. | |
| 7,675,997 B2 | 3/2010 | Yui et al. | |
| 8,269,491 B2 | 9/2012 | Cummings et al. | |
| 2007/0280390 A1* | 12/2007 | Hidaka | G01D 21/00 375/350 |
| 2008/0310495 A1* | 12/2008 | Bulzacchelli | H04L 25/03057 375/233 |
| 2009/0146722 A1 | 6/2009 | Chen et al. | |
| 2012/0086494 A1 | 4/2012 | Asada et al. | |
| 2012/0269305 A1 | 10/2012 | Hogeboom | |
| 2013/0148702 A1* | 6/2013 | Payne | H03M 1/0607 375/219 |
| 2014/0226707 A1* | 8/2014 | Kaviani | H04L 25/03063 375/233 |
| 2014/0355658 A1* | 12/2014 | Meier | H04L 1/244 375/224 |
| 2015/0180642 A1* | 6/2015 | Hsieh | H04L 7/0025 375/233 |

* cited by examiner

*Primary Examiner* — Tesfaldet Bocure
(74) *Attorney, Agent, or Firm* — Brandon C. Kennedy; Steven Meyers; Kennedy Lenart Spraggins LLP

(57) ABSTRACT

Dynamically calibrating an offset of a receiver with a DFE while performing data transport operations, the DFE comprising a plurality of independent data transport banks, at least one data transport bank operating a data transport mode and at least one data transport bank operating in a calibration mode, including: iteratively, while carrying out data transport operations: utilizing the data transport bank operating in the data transport mode to perform data transport operations; calibrating the data transport bank operating in the calibration mode; and upon completing calibration of the data transport bank operating in the calibration mode, switching the mode of each data transport bank.

19 Claims, 4 Drawing Sheets

US 9,444,657 B2

DYNAMICALLY CALIBRATING THE OFFSET OF A RECEIVER WITH A DECISION FEEDBACK EQUALIZER (DFE) WHILE PERFORMING DATA TRANSPORT OPERATIONS

BACKGROUND

1. Technical Field

The technical field is data processing, or, more specifically, methods, apparatus, and products for dynamically calibrating the offset of a receiver with a Decision Feedback Equalizer ('DFE') while performing data transport operations.

2. Description of Related Art

Serial chip-to-chip communications at very high speed data rates can be limited by channel loss and intersymbol interference that arises from the physical characteristics of the data communications channel. An effective way for equalizing channel loss and negating the impact of intersymbol interference is to use a high performance DFE in the receiver. A receiver with a DFE can have many high speed receiving data paths. Due to the complexity of the high performance data paths, an offset voltage may be introduced at each of the receiving data paths, thereby causing the voltage level of an incoming data signal to be skewed. Such an offset voltage can be accumulated to a high level and can impact the performance of the linear data path by causing eye closure of the incoming data at a sample latch.

The magnitude of the offset voltage at the input of a particular sample latch in a data path may be different than the magnitude of the offset voltage at the input of sample latches in other data paths. To ensure proper sampling of incoming data signals, the offset voltage at the input of each sample latch must be removed, thereby opening the incoming data eye for each data path individually. Although a receiver with a DFE can have many high speed data paths for receiving and processing an incoming signal, some portion of the each data path may be shared. The shared portion of each data path can also experience the introduction of an offset voltage that may be accumulated to a high level. This offset voltage in the shared portion of each data path must also be removed. The magnitude of each offset voltage is time variant such that the magnitude of each offset voltage may change over time, creating the need for continual calibration.

SUMMARY

Methods, apparatus, and products for dynamically calibrating the offset of a receiver with a DFE while performing data transport operations, the receiver with the DFE comprising a global linear data path in series with a plurality of independent data transport banks, at least one data transport bank operating a data transport mode and at least one data transport bank operating in an offset calibration mode, including: iteratively, while carrying out data transport operations: utilizing the data transport bank operating in the data transport mode to perform data transport operations; calibrating the offset of the data transport bank operating in the offset calibration mode; and upon completing calibration of the data transport bank operating in the calibration mode, switching the mode of each data transport bank.

The foregoing and other objects, features and advantages will be apparent from the following more particular descriptions of example embodiments as illustrated in the accompanying drawings wherein like reference numbers generally represent like parts of example embodiments.

DETAILED DESCRIPTION OF EXAMPLE EMBODIMENTS

Figure 1:
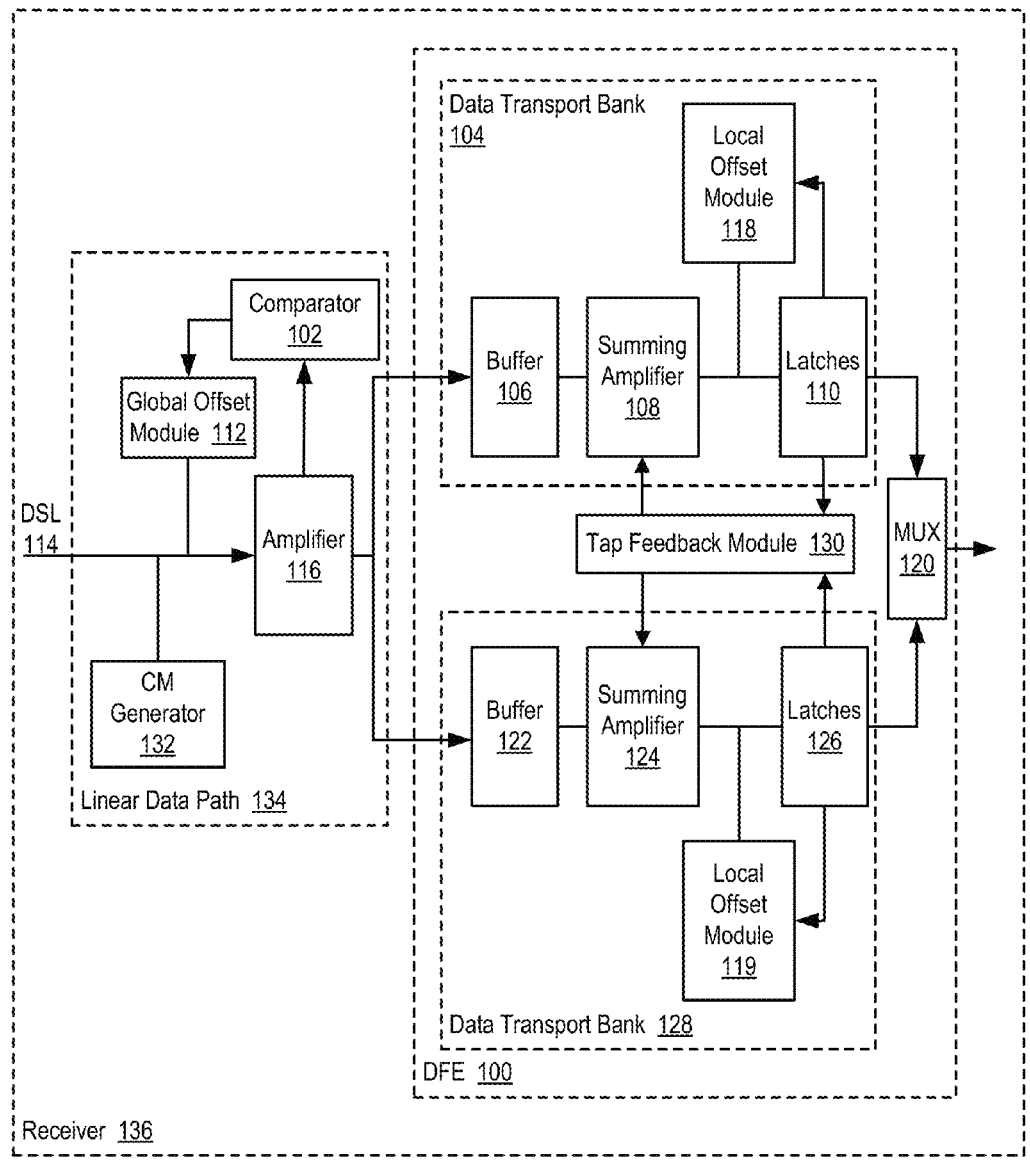
FIG. 1 sets forth a block diagram of an example receiver with a DFE that may be dynamically calibrated while performing data transport operations.

Example methods, apparatus, and products for dynamically calibrating the offset voltage of a receiver with a Decision Feedback Equalizer ('DFE') while performing data transport operations are described with reference to the accompanying drawings, beginning with FIG. 1. FIG. 1 sets forth a block diagram of a receiver (136) with a DFE (100) for which the offset voltages at a global position and at various local positions may be dynamically calibrated while performing data transport operations.

The receiver (136) of FIG. 1 can include a global linear data path (134). The global linear data path (134) represents the shared portion of each data communications path in the receiver (136). That is, all incoming data signals received by the receiver (136) traverse the global linear data path (134). In the example of FIG. 1, the global linear data path (134) can include an amplifier (116). Such an amplifier (116) can include multiple stages with a designated frequency response. The amplifier (116) may amplify an incoming differential data signal such that the incoming differential data signal is in a predetermined voltage range before being sampled the DFE (100). Although only a single amplifier (116) is depicted outside of the data transport banks (104, 128) of the DFE (100), readers will appreciate that multiple amplifiers (116) may amplify an incoming signal that is received over a differential signal line, such as data signal line (114). In such an example, however, the amplifier (116) may not operate perfectly and may introduce offset voltage into the signal. The amplifier (116) may not operate perfectly and may introduce offset voltage into the received signal as the parameters of the differential components in the amplifier (116) become asymmetrical, as fluctuations in temperature impact the operation of the amplifier (116), and so on such that the performance of the amplifier (116) varies at different points in time. For example, when an amplifier (116) has no input voltage, the amplifier may still output a small voltage as the result of imperfections in the amplifier (116). In an example in which multiple amplifiers exist, these imperfections can get amplified. As such, the receiver (136) of FIG. 1 is configured to correct for such offset voltages.

The receiver (136) can correct for such offset voltages of the amplifier (116) through the use of a comparator (102) and a global offset module (112). The comparator (102) of FIG. 1 may be configured to determine whether the differential input voltage is greater than a predetermined value and output a particular value in dependence upon such a determination. For example, the comparator (102) may determine whether the differential input voltage is greater than or less than a predetermined value of 0 V. If the differential input voltage is greater than 0 V, the comparator (102) may output a value of 1. If the differential input voltage is less than 0 V, however, the comparator (102) may output a value of 0. In such an example, the output of the comparator (102) may subsequently be sent to a global offset module (102) and used by the global offset module (102) as described in greater detail below. In such a way, the comparator (102) of FIG. 1 may be used to determine whether an output voltage generated by the amplifier (116) matches an expected output voltage, is less than an expected output voltage, or is greater than an expected output voltage. In particular, the comparator (102) may be used during system initialization to determine an offset voltage created by the amplifier (116).

In the example depicted in FIG. 1, a voltage source other than the digital signal line (114) may supply a known common mode voltage that includes zero differential input voltage to the amplifier (116), which has a known gain, and therefore a known expected output voltage. In such an example, a common mode generator (132) may serve as such a voltage source and a pair of analog switches or other devices may be used to block the differential input from the data communication channel. Because the expected offset output voltage of the amplifier (116) is known when only a common mode voltage with zero differential input voltage is applied to the amplifier (116), a differential correction voltage may be applied to the amplifier (116) to cancel the known offset voltage of the amplifier (116). When the known offset voltage of the amplifier (116) is cancelled, the actual differential output voltage of the amplifier (116) is 0 V. The actual differential output voltage of the amplifier (116) may be passed to the comparator (102) to be evaluated to determine if the actual differential output voltage of the amplifier (116) is greater than, less than, or equal to 0 V. If the actual differential output voltage of the amplifier (116) is greater than 0 V, the differential correction voltage applied to the amplifier (116) can be decreased. If the actual differential output voltage of the amplifier (116) is less than 0 V, the differential correction voltage applied to the amplifier (116) may be increased. The output of the comparator (102) can subsequently be passed to the global offset module (112) for use in correcting an offset voltage as described in more detail below.

The receiver (136) of FIG. 1 also includes a global offset module (112). The global offset module (112) may be embodied as automated computing machinery for receiving values from the comparator (102) and outputting a voltage in dependence upon the received values. In the example of FIG. 1, the global offset module (112) may include a DAC that converts a digital signal to an analog signal. Consider the example described above in which the comparator (102) outputs a 1 when the differential output voltage generated by the amplifier (116) is greater than or equal to 0 V and the comparator (102) outputs a 0 when the differential output voltage generated by the amplifier (116) is less than 0 V. In such an example, in order to correct for the offset voltage introduced by the amplifier (116), the global offset module (112) may initially output no correction voltage. Every time the global offset module (112) receives a 1 from the comparator (102), however, the global offset module (112) can decrease the amount of correction voltage output by the global offset module (112), even to the point where the global offset module (112) can output a negative correction voltage. Likewise, the global offset module (112) may increase the amount of correction voltage output by the global offset module (112) when the global offset module (112) receives a 0 from the comparator (102).

Consider an example in which a voltage source such as the common mode generator (132) generates a common mode voltage with zero differential input voltage and the amplifier (116) has a gain of five. Assume that the output offset voltage of the amplifier (116) is 250 mV. In such an example, the expected input offset voltage of the amplifier (116) when no differential data signal is received would be 50 mV. Because the output of the amplifier (116) is transmitted to the comparator (102), the comparator (102) could determine whether the output voltage of the amplifier (116) is greater than 0 V. The comparator (102) can be configured to output a value of 1 upon determining that the output voltage of the amplifier (116) is greater than 0 V. In such an example, the global offset module (112) may therefore generate a negative correction voltage. Through many iterations and comparisons, global offset module (112) may continue to decrease the magnitude of the correction voltage until the output of the comparator (102) changes from 1 to 0. In such an example, if the output voltage of the amplifier (116) was less than 0 V, the comparator (102) may be configured to output a value of 0, indicating that the correction voltage generated by the global offset module (112) is less than −50 mV required to correct the offset voltage of the amplifier. As such, the global offset module (112) would subsequently increase the correction voltage when the output of the comparator (112) changes from 1 to 0. Upon receipt of a 0 from the comparator (102), the global offset module (112) may increase the voltage of the correction voltage. In such a way, when the output of the comparator (102) toggles between 1 and 0, the correction voltage should be −50 mV and the 50 mV of input offset voltage to the amplifier (116) when no differential data signal is received may be cancelled out.

The output from the comparator (102) can be passed to the global offset module (112) for use in determining the proper correction voltage to apply. For example, the global offset module (112) may be configured to initially output a correction voltage of 0 V. In such an example, every time that the global offset module (112) receives a value of 1, which indicates that the correction voltage generated by the global offset module (112) was more than required, the global offset module (112) can decrease the amount of correction voltage provided by the global offset module (112). Over time as the global offset module (112) decreases the amount of correction voltage applied to the digital signal line (114), the output voltage of the amplifier (116) will eventually drop below 0 V, causing the output value of the comparator (102) to change from a 1 to a 0. In such an example, the global offset module (112) may be configured to cease changing the amount of correction voltage applied to the digital signal line (114) when the output of the comparator (102) changes from a 1 to a 0 or changes from a 0 to a 1. In such a way, the global offset module (112) will introduce a correction voltage that causes the amplifier (116) to generate an output voltage that is within one voltage step from the global offset module (112) of the expected output voltage of 0 V for the amplifier (116). By performing this process during initialization of the computing system that the receiver (136) resides within, a portion of the offset voltage caused by amplifying a signal using amplifier (116) can be removed during system initialization.

The receiver (136) of FIG. 1 also includes a DFE (100). The DFE (100) of FIG. 1 is a module of automated computing machinery, such as a circuit, for reversing the distortion incurred by a signal transmitted through a data communications channel. A signal transmitted through a data communications channel may be distorted, for example, by intersymbol interference in which a previously received signal impacts a presently received signal. The DFE (100) of FIG. 1 can augment a standard linear equalizer by adjusting an incoming signal in dependence upon information gathered during the receipt of previous signals. The DFE (100) of FIG. 1 may reside within a receiver (136) that receives a differential signal from a sender, such that the receiver (136) can account for any channel loss or intersymbol interference that occurred in transmitting the differential signal from the sender to the receiver (136).

The DFE (100) of FIG. 1 is coupled to a data signal line (114) that is part of a linear data path (134) included in a receiver (136) that receives digital signals from a sender. Although the data signal line (114) of FIG. 1 is illustrated as a single line, readers will appreciate that the data signal line (114) may be embodied as a pair of differential signal lines. Such differential signal lines represent a data communications channel for receiving a digital signal such as a non-return-to-zero ('NRZ') signal in which a positive voltage represents a binary 1 and a negative voltage represents a binary 0. Such an NRZ signal may be embodied, for example, as a waveform that switches between a high voltage level and a low voltage level that represent a discrete value such as a binary 0 or binary 1. Although not depicted in FIG. 1, the DFE (100) of FIG. 1 may be embodied as a ½ rate DFE in which half of the incoming data signals are processed by one set of computing hardware while the other half of the incoming data signals are processed by another set of computing hardware as described below.

The DFE (100) of FIG. 1 includes two data transport banks (104, 128). Each data transport bank (104, 128) can include computer hardware for reversing the distortion incurred by a signal transmitted through a data communications channel. In the example of FIG. 1, each data transport bank (104, 128) includes a buffer (106, 122). In the example of FIG. 1, each buffer (106, 122) may be configured to pass a received voltage to a connected summing amplifier (108, 124). Each summing amplifier (108, 124) of FIG. 1 may be embodied as circuitry for summing weighted values such as a plurality of weighted voltages. The summing amplifiers (108, 124) may be useful in restoring a differential signal received by the DFE (100) to the same state that the signal was transmitted by the sender, thereby overcoming the impact of channel loss or intersymbol interference by summing the received signal with values that are associated with previously received signals.

Consider an example in which an incoming signal is embodied as a differential signal that includes a first signal and a second signal, where the voltage differential between the two signals is used to determine whether the differential signal represents a binary 1 or a binary 0. For example, a differential voltage of 0.5 V could represent a binary 1 and a differential voltage of −0.5 V could represent a binary 0. In such an example, assume that a bit pattern of '101' is transmitted from a sender to a receiver. During a first clock cycle, the summing amplifier (108) would receive a signal with a differential voltage of 0.5 V over a data signal line (114). During a second clock cycle, even though the sender had transmitted a signal with a differential voltage of −0.5 V, physical limitations of the data communications channel could cause some portion of the signal with a differential voltage of 0.5 V received during the first clock cycle to remain in the data communications channel. For example, the summing amplifier (108) may receive a signal with a differential voltage of −0.4 V over a data signal line (114) during the second clock cycle, as some portion of the first signal is interfering with the second signal (e.g., through intersymbol interference). In such an example, the summing amplifier (108) may also receive a feedback tap instructing the summing amplifier (108) to add −0.1 V to the incoming signal in order to remove the impact of intersymbol interference, such that the summing amplifier (108) outputs a value of −0.5V, accurately representing the current signal adjusted for the impact of intersymbol interference. Such a feedback tap may be generated by a tap-feedback module (130) and provided as input to the summing amplifiers (108, 124) as described in greater detail below. In the example of FIG. 1, each tap represents an offset voltage that is applied to an incoming data signal in order to negate the effects of intersymbol interference.

Each data transport bank (104, 128) in the example of FIG. 1 also includes one or more latches (110, 126). In the example depicted in FIG. 1, at least one latch (110, 126) may be coupled to a summing amplifier (108, 124) and may operate as a sample latch for sampling the output of the summing amplifier (108, 124) and determining whether such output represents a binary 1 or binary 0. For example, the sample latch may determine whether the output of the summing amplifier (108, 124) represents a binary 1 or a binary 0 based on whether the differential output voltage of the summing amplifier (108, 124) is greater than 0 V or less than 0 V. In the example depicted in FIG. 1, additional latches may be coupled to each other and may be configured to store a discrete value such as a binary 1 or binary 0. The DFE (100) of FIG. 1 can therefore operate by one of the latches (110, 126) sampling the output of the summing amplifier (108, 124) and determining whether the output of the summing amplifier (108, 124) represents a binary 1 or binary 0. In such a way, when many latches (110, 126) are chained together, a sequence of binary values representing a sequence of data signals received by the DFE (100) may be retained by storing each binary value in a different latch. Readers will appreciate that such a DFE (100) may include any number of latches for storing previously received values.

In the example of FIG. 1, each of the latches (110, 126) is coupled to a tap-feedback module (130). In the example of FIG. 1, the tap-feedback module (130) may be embodied as automated computing machinery for receiving values stored in one or more latches (110, 126) and providing input to a summing amplifier (108, 124) to negate the effects of intersymbol interference. As such, the tap-feedback module (130) operates as part of a feedback loop to the summing amplifiers (108, 124). In the example of FIG. 1, the tap-feedback module (130) may include a digital-to-analog converter ('DAC') that converts a digital signal to an analog signal. For example, each DAC may be configured to convert the digital value stored in a particular latch (110, 126) to an analog current that is fed into a summing amplifier (108, 124). In such a way, the DAC may serve as a current source that introduces an appropriate offset voltage to a summing amplifier (108, 124) for negating the impact of intersymbol interference caused by previously received signals.

In the example of FIG. 1, the DFE (100) can utilize the retained recent history of data signals that were received by the DFE (100) to cancel out the effects of intersymbol interference on a currently received data signal. The DFE (100) can utilize the retained recent history of data signals that were received by the DFE (100) to cancel out the effects of intersymbol interference on a currently received data signal because the amount of interference introduced by a previously received data signal can be measured and known. For example, the amount of interference introduced by a binary 1 received one clock cycle prior to the currently received data signal is a quantifiable amount, the amount of interference introduced by a binary 1 received two clock cycles prior to the currently received data signal is another quantifiable amount, the amount of interference introduced by a binary 0 received three clock cycles prior to the currently received data signal is yet another quantifiable amount, and so on.

The DFE (100) of FIG. 1 also includes local offset modules (118, 119) that reside within a data transport bank (104, 128). The local offset modules (118, 119) of FIG. 1 operate in a similar manner to the global offset module (112). The local offset modules (118, 119) are 'local' in the sense that at a given point in time, the local offset modules (118, 119) are attempting to correct an offset voltage introduce by the summing amplifier (108, 124) and the buffer (106, 122) of a particular data transport bank (104, 128). That is, at a given point in time the local offset modules (118, 119) will be attempting to correct an offset voltage introduced by the summing amplifier (108) and the buffer (106) of data transport bank (104) or alternatively attempting to correct an offset voltage introduce by the summing amplifier (124) and the buffer (122) of data transport bank (128). In contrast to the local offset modules (118, 119), the global offset module (112) is 'global' in the sense that the global offset module (112) is attempting to correct an offset voltage introduced by the amplifier (116) whose operation impacts both data transport banks (104, 128).

The local offset modules (118, 119) may be embodied as automated computing machinery for receiving values from one of the latches (110, 126) at a given point in time and outputting a correction voltage to the corresponding summing amplifier (108, 124) in dependence upon the received value. In the example of FIG. 1, the local offset modules (118, 119) may include a DAC that converts a digital signal to an analog signal. Consider an example in which a differential output voltage of 0.5 V represents a binary 1 and a differential output voltage of −0.5 V represents a binary 0. In such an example, each latch (110, 126) may be used as a voltage comparator for determining whether the midpoint of the differential output voltage received from a corresponding summing amplifier (108, 124) is greater than, less than, or equal to 0 V. Because the midpoint of the differential output voltage of each summing amplifier (108, 124) should be 0 V without any offset voltage, the latches (110, 126) may be used to determine whether the midpoint of the differential output voltage of each summing amplifier (108, 124) is correct. If the midpoint of the differential output voltage of a particular summing amplifier (108, 124) is not 0 V, the latch (110, 126) can send a signal to the appropriate local offset module (118, 119) to generate a correction voltage to cancel the local offset at the output of the summing amplifier (108, 124). For example, each latch (110, 126) may be configured to output a 1 when the midpoint of the differential output voltage generated by the corresponding summing amplifier (108, 124) is greater than 0 V. Likewise, each latch (110, 126) may be configured to output a 0 when the midpoint of the differential output voltage generated by the corresponding summing amplifier (108, 124) is less than 0 V. In order to correct for the offset voltage introduced by the corresponding summing amplifier (108, 124) and buffer (106, 122), the appropriate local offset module (118, 119) may decrease the amount of correction voltage output by the appropriate local offset module (118, 119) when the local offset module (118, 119) receives a 1 from a latch (110, 126) and may also be configured to increase the amount of correction voltage output by the local offset module (118, 119) when the local offset module (118, 119) receives a 0 from a latch (110, 126). The local offset modules (118, 119) may be configured to cease changing the amount of correction voltage applied to the appropriate summing amplifier (108, 124) when the output of the corresponding latch (110, 126) changes from a 1 to a 0 or changes from a 0 to a 1. In such a way, the local offset modules (118, 119) will introduce a correction voltage that causes the summing amplifier (108, 124) to generate a differential output voltage that is within one voltage step from the local offset module (118, 119) of the expected differential output voltage of 0 V.

Readers will appreciate that the receiver (136) of FIG. 1 adjusts for offset voltages caused by amplifiers (108, 116, 124), buffers (106, 122), and latches (110, 126) in two stages. In a first stage, the receiver (136) adjusts for an offset voltage caused by amplifier (116) during system initialization. In a second stage, the receiver (136) adjusts for offset voltages caused by summing amplifiers (108, 124), buffers (106, 122), and latches (110, 126) during system operation. That is, the receiver (136) may operate by using one data transport bank (104) for carrying out data transport operations while simultaneously adjusting for the offset voltage caused by the summing amplifier (124), buffers (122), and latches (126) in the other data transport bank (128). Once the offset voltage caused by the summing amplifier (124), buffer (122), and latches (126) in data transport bank (128) has been calculated and adjusted for, the receiver (136) may use data transport bank (128) for carrying out data transport operations in view of the fact that data transport bank (128) has been recently calibrated. When the receiver (136) switches the responsibility of carrying out data transport operations to data transport bank (128), the receiver (136) may begin calibrating data transport bank (104). When data transport bank (104) has been calibrated, the receiver (136) may switch the responsibility for carrying out data transport operations back to data transport bank (104). The receiver (136) can continue to operate in such a manner, such that one data transport bank (104, 128) is always carrying out data transport operations while the other data transport bank (104, 128) is being calibrated. Once calibrated, the roles of each data transport bank (104, 128) can be switched, such that the receiver (136) is always utilizing a recently calibrated data transport bank (104, 128). As such, even if operating conditions change, the receiver (136) can still operate reliably.

Readers will further appreciate that although each data transport bank (104, 128) is depicted as including only a single data path comprised of a buffer, summing amplifier, and latches, each data transport bank (104, 128) may include a plurality of data paths. In addition, each data transport bank (104, 128) may operate as a ½ rate DFE in which half of all incoming signals are processed by one group of hardware (e.g., one set of hardware that includes a buffer, summing amplifier, and latches) while the other half of all incoming signals are processed by another group of hardware that includes a distinct buffer, distinct summing amplifier, and distinct set of latches. As such, the receiver (136) may include multiplexers in addition to the illustrated MUX (120) for use in outputting data using the appropriate data transport bank (104, 128).

Figure 2:
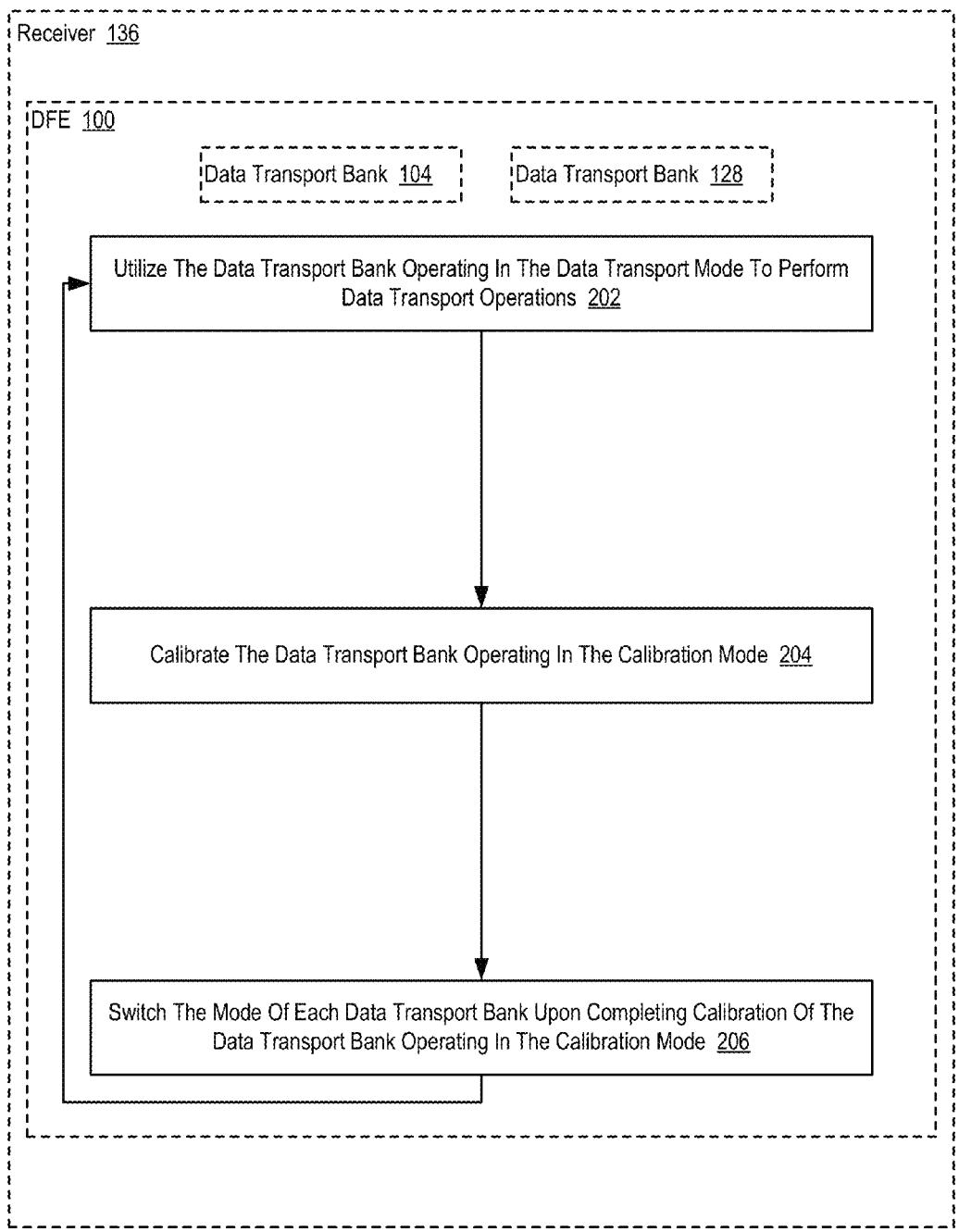
FIG. 2 sets forth a flow chart illustrating an example method for dynamically calibrating the offset of a receiver with a DFE while performing data transport operations.

For further explanation, FIG. 2 sets forth a flow chart illustrating an example method for dynamically calibrating the offset of a receiver (136) with a DFE (100) while performing data transport operations. Although not illustrated in FIG. 2, the receiver (136) and the DFE (100) of FIG. 2 may be similar to the receiver and the DFE illustrated in FIG. 1 and described above. The DFE (100) of FIG. 2 can include a plurality of independent data transport banks (104, 128). Each independent data transport bank (104, 128) may include one or more summing amplifiers, one or more latches, and computer hardware and software for reversing the distortion incurred by a signal transmitted through a data communications channel.

In the example method of FIG. 2, at least one data transport bank (104) is operating in a data transport mode. In the example method of FIG. 2, a data transport bank (104) that is operating in a data transport mode represents a group of computer hardware devices in the DFE (100) that is carrying out the signal processing operations of the DFE (100), including removing the effects of intersymbol interference on an incoming data signal and outputting the equalized data signal. In the example method of FIG. 2, the data transport bank (104) may operate in the data transport mode, for example, as the result of an incoming signal received by data transport bank (104) that specifies an operational mode. For example, an incoming signal with a value of 0 may indicate that the data transport bank (104) is to operate in the data transport mode while incoming signal with a value of 1 may indicate that the data transport bank (104) is to operate in the calibration mode. In such an example, such a signal may also be passed to other hardware within the DFE (100) such as a local offset module (118, 119 of FIG. 1), a tap feedback module (130 of FIG. 1), and a multiplexer (120) to ensure proper operation of the DFE (100).

In the example method of FIG. 2, at least one data transport bank (128) is operating in a calibration mode. In the example method of FIG. 2, a data transport bank (128) that is operating in a calibration mode represents a group of computer hardware devices in the DFE (100) that is not carrying out the signal processing operations of the DFE (100). A data transport bank (128) that is operating in a calibration mode does not, while in the calibration mode, contribute to removing the effects of intersymbol interference on an incoming data signal and outputting the equalized data signal. A data transport bank (128) that is operating in a calibration mode can provide information to a local offset module (118, 119 of FIG. 1) for adjusting for offset voltage introduced by a summing amplifier, buffer, and latches in the data transport bank (128) as described above with reference to FIG. 1. In the example method of FIG. 2, the data transport bank (128) may operate in the calibration mode, for example, as the result of an incoming signal that specifies an operational mode. For example, an incoming signal with a value of 0 may indicate that the data transport bank (128) is to operate in the data transport mode while an incoming signal with a value of 1 may indicate that the data transport bank (128) is to operate in the calibration mode. In such example, such a signal may also be passed to other hardware within the DFE (100) such as a local offset module (118 of FIG. 1), a tap feedback module (130 of FIG. 1), and a multiplexer (120) to ensure proper operation of the DFE (100).

The example method of FIG. 2 includes utilizing (202) the data transport bank (104) operating in the data transport mode to perform data transport operations. In the example method of FIG. 2, utilizing (202) the data transport bank (104) operating in the data transport mode to perform data transport operations may be carried out by the data transport bank (104) receiving an incoming data signal, applying the appropriate voltage taps to the incoming data signal, determining whether the altered signal represents a binary 0 or binary 1, and outputting the binary 0 or binary 1 as described above with reference to FIG. 1.

The example method of FIG. 2 also includes calibrating (204) the data transport bank (128) operating in the calibration mode. In the example method of FIG. 2, calibrating (204) the data transport bank (128) operating in the calibration mode may be carried out, for example, by determining whether the midpoint of a differential output voltage of a summing amplifier in the data transport bank (128) is greater than, less than, or equal to 0 V as described above and altering the amount of correction voltage generated by a local offset module in dependence upon such a determination. In such an example the amount of correction voltage generated by a local offset module may be set when the amount of correction voltage generated by a local offset module is properly calibrated, as described above with reference to FIG. 1.

The example method of FIG. 2 also includes switching (206) the mode of each data transport bank (104, 128) upon completing calibration of the data transport bank (128) operating in the calibration mode. In the example method of FIG. 2, switching (206) the mode of each data transport bank (104, 128) may be carried out by altering the value of a mode input signal that is provided to each data transport bank (104, 128). Readers will appreciate that by switching the mode of each data transport bank (104, 128) after a particular data transport bank (104, 128) has been calibrated, the receiver (136) and the DFE (100) are always utilizing a most recently calibrated data transport bank (104, 128). As such, even if operating conditions change, the receiver (136) and the DFE (100) can still operate reliably.

In the example method of FIG. 2, utilizing (202) the data transport bank (104) operating in the data transport mode to perform data transport operations, calibrating (204) the data transport bank (128) operating in the calibration mode, and switching the mode of each data transport bank (104, 128) upon completing calibration of the data transport bank (128) operating in the calibration mode are performed iteratively while carrying out data transport operations. In such a way, repeatedly calibrating each data transport bank (104, 128) does not interfere with the data transport and signal processing operations of the receiver (136) and the DFE (100).

Figure 3:
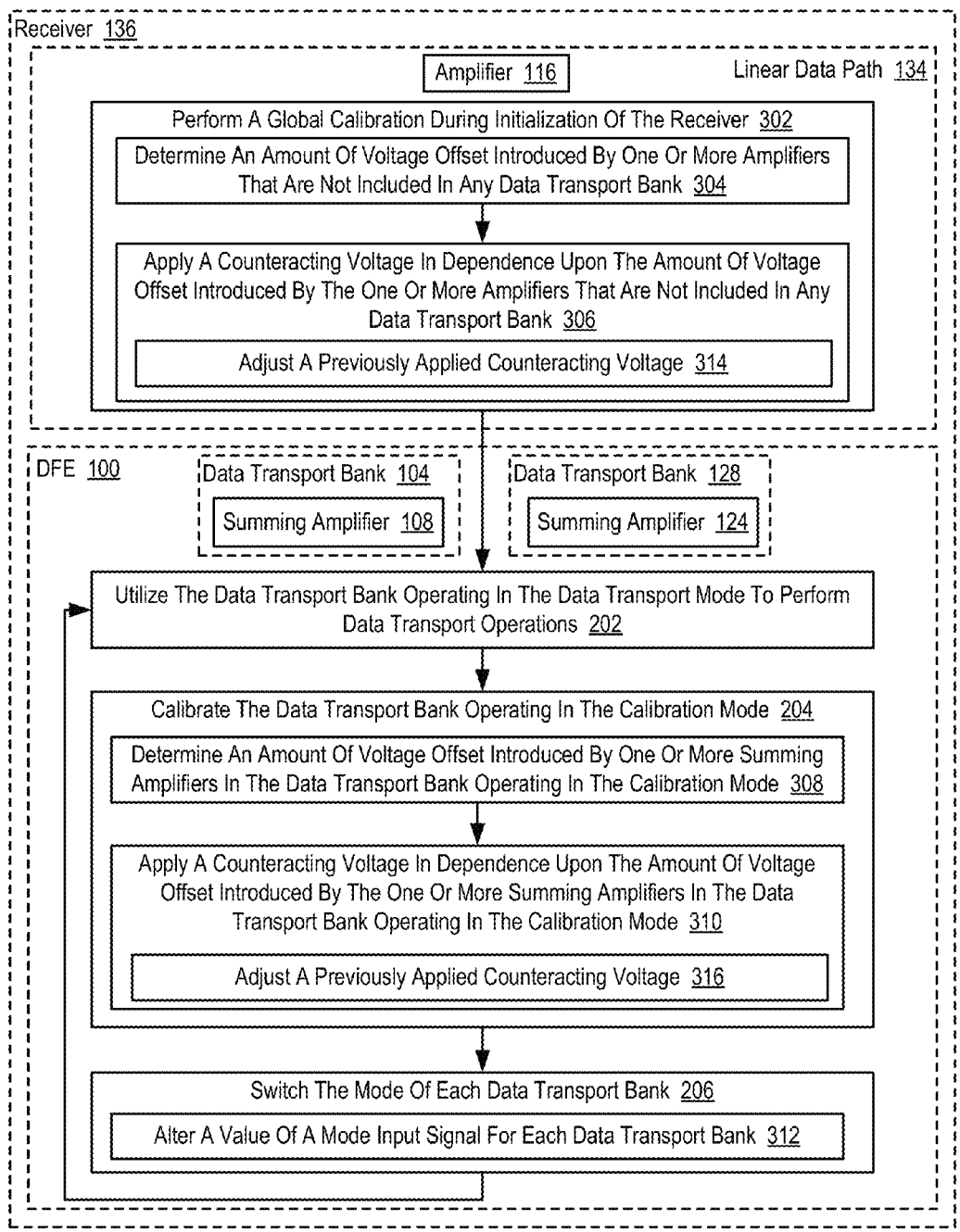
FIG. 3 sets forth a flow chart illustrating an additional example method for dynamically calibrating the offset of a receiver with a DFE while performing data transport operations.

For further explanation, FIG. 3 sets forth a flow chart illustrating a further example method for dynamically calibrating the offset of a receiver (136) with a DFE (100) while performing data transport operations. The example method of FIG. 3 is similar to the example method of FIG. 2 as it also includes utilizing (202) the data transport bank (104) operating in the data transport mode to perform data transport operations, calibrating (204) the data transport bank (128) operating in the calibration mode, and switching (206) the mode of each data transport bank (104, 128) upon completing calibration of the data transport bank (128) operating in the calibration mode.

The example method of FIG. 3 also includes performing (302) a global calibration during initialization of the receiver (136). In the example method of FIG. 3, performing (302) a global calibration during initialization of the receiver (136) may be carried out by adjusting for offset voltages introduced by one or more amplifiers (116) that are not part of any single data transport bank (104, 128). The one or more amplifiers (116) may not operate perfectly and may introduce unwanted offset voltage into a data signal received by the receiver (136). The one or more amplifiers (116) may not operate perfectly and may introduce unwanted offset voltage into a data signal received by the receiver (136) as the one or more amplifiers (116) age and parts become worn out, as fluctuations in temperature impact the operation of the one or more amplifiers (116), and so on. For example, when the one or more amplifiers (116) have no input voltage, the one or more amplifiers (116) may still output a small voltage as the result of imperfections in the one or more amplifiers (116). In an example in which multiple amplifiers exist, these imperfections can get amplified. As such, the receiver (136) must adjust an incoming data signal to account for such offset voltages.

In the example method of FIG. 3, performing (302) a global calibration during initialization of the receiver (136) includes determining (304) an amount of offset voltage introduced by the one or more amplifiers (116) that are not included in any data transport bank (104, 128). In the example method of FIG. 3, determining (304) an amount of offset voltage introduced by one or more amplifiers (116) that are not included in any data transport bank (104, 128) may be carried out through the use of a voltage comparator and a voltage source. In such an example, assume that a known voltage is applied to the one or more amplifiers (116) which have a known gain. In such an example, the expected output of the one or more amplifiers (116) can be determined by multiplying the voltage that is applied to the one or more amplifiers (116) by the gain of the one or more amplifiers (116).

When the known voltage is applied to the one or more amplifiers (116), the actual output voltage of the one or more amplifiers (116) can be compared to the expected output voltage of the one or more amplifiers (116) by a voltage comparator. The voltage comparator may be configured to output a 1 when the actual output voltage generated by the one or more amplifiers (116) is greater than or equal to the expected output voltage and further configured to output a 0 when the actual output voltage generated by the one or more amplifiers (116) is less than the expected output voltage. In such a way, the output of such a voltage comparator may be passed to a voltage source, which increases or decreases a voltage that the voltage source applies to the one or more amplifiers (116) in dependence upon the output of the voltage comparator. By iteratively repeating this process, the amount of offset voltage introduced by the one or more amplifiers (116) may be determined (304) as being equal to the amount of voltage that the voltage source applies to the one or more amplifiers (116) when the output of the voltage comparator changes from 0 to 1 or changes from 1 to 0, as described above with reference to FIG. 1.

In the example method of FIG. 3, performing (302) a global calibration during initialization of the receiver (136) also includes applying (306) a counteracting voltage in dependence upon the amount of offset voltage introduced by the one or more amplifiers (116) that are not included in any data transport bank (104, 128). As described above, the amount of offset voltage introduced by the one or more amplifiers (116) may be determined (304) as being equal to the amount of voltage that the voltage source applies to the one or more amplifiers (116) when the output of the voltage comparator changes from 0 to 1 or changes from 1 to 0. In such an example, applying (306) a counteracting voltage in dependence upon the amount of offset voltage introduced by the one or more amplifiers (116) may be carried out using a voltage source that is coupled to the one or more amplifiers (116) such that the voltage source can provide input voltage to the one or more amplifiers (116). Such a voltage source can apply (306) a counteracting voltage that is equal in magnitude to the amount of offset voltage introduced by the one or more amplifiers (116) as determined (304) above.

In the example method of FIG. 3, applying (306) a counteracting voltage in dependence upon the amount of offset voltage introduced by the one or more amplifiers (116) that are not included in any data transport bank (104, 128) may be carried out by adjusting (314) a previously applied counteracting voltage in dependence upon the amount of offset voltage introduced by the one or more amplifiers (116) that are not included in any data transport bank (104, 128). Consider an example in which a positive offset voltage of 50 mV is introduced by the one or more amplifiers (116) that are not included in any data transport bank (104, 128). In such an example, a countering voltage of −5 mV may initially be applied. In such an example, the receiver (136) may again test the output of the amplifier (116) to determine whether the positive offset voltage of 50 mV has been cancelled. In the event that the positive offset voltage of 50 mV has not been fully cancelled, the receiver (136) may decrease the countering voltage to −10 mV. Such a process may be iteratively repeated, and a previously applied counteracting voltage may be adjusted (314), until the positive offset voltage of 50 mV has been cancelled.

In the example method of FIG. 3, calibrating (204) the data transport bank (128) operating in the calibration mode includes determining (308) an amount of offset voltage introduced by one or more summing amplifiers (124), buffers, and latches in the data transport bank (128) operating in the calibration mode. In the example method of FIG. 3, determining (308) an amount of offset voltage introduced by the one or more summing amplifiers (124), buffers, and latches in the data transport bank (128) operating in the calibration mode may be carried out through the use of a voltage comparator and a voltage source. In such an example, the actual output voltage from one or more summing amplifiers (124) in the data transport bank (128) should match one of two values—a voltage level associated with a binary 1 or a voltage level associated with a binary 0. In such an example, the expected output voltage of the one or more summing amplifiers (124) can be compared to the actual output voltage of the one or more summing amplifiers (124). The voltage comparator may be configured to output a 1 when the actual output voltage generated by the one or more summing amplifiers (124) is greater than or equal to the expected output voltage and further configured to output a 0 when the actual output voltage generated by the one or more summing amplifiers (124) is less than the expected output voltage. In such a way, the output of such a voltage comparator may be passed to a voltage source, which increases or decreases a voltage that the voltage source applies to the one or more summing amplifiers (124) in dependence upon the output of the voltage comparator. By iteratively repeating this process, the amount of offset voltage introduced by the one or more summing amplifiers (124) may be determined (308) as being equal to the amount of voltage that the voltage source applies to the one or more summing amplifiers (124) when the output of the voltage comparator changes from 0 to 1 or changes from 1 to 0, as described above with reference to FIG. 1.

In the example method of FIG. 3, calibrating (204) the data transport bank (128) operating in the calibration mode also includes applying (310) a counteracting voltage in dependence upon the amount of offset voltage introduced by the one or more summing amplifiers (124) in the data transport bank (128) operating in the calibration mode. As described above, the amount of offset voltage introduced by the one or more summing amplifiers (124) may be determined (308) as being equal to the amount of voltage that the voltage source applies to the one or more summing amplifiers (124) when the output of the voltage comparator changes from 0 to 1 or changes from 1 to 0. In such an example, applying (310) a counteracting voltage in dependence upon the amount of offset voltage introduced by the one or more summing amplifiers (124) may be carried out using a voltage source that is coupled to the one or more summing amplifiers (124) such that the voltage source can provide input voltage to the one or more summing amplifiers (124). Such a voltage source can apply (310) a counteracting voltage that is equal in magnitude to the amount of offset voltage introduced by the one or more summing amplifiers (124) as determined (308) above.

In the example method of FIG. 3, applying (310) a counteracting voltage may be carried out, for example, by adjusting (316) a previously applied counteracting voltage in dependence upon the amount of offset voltage introduced by the one or more summing amplifiers (124), buffers, and latches in the data transport bank operating in the calibration mode (128). Consider an example in which a positive offset voltage of 50 mV is introduced by the one or more amplifiers (124), buffers, and latches in the data transport bank operating in the calibration mode (128). In such an example, a countering voltage of −5 mV may initially be applied. In such an example, the receiver (136) may again test the output of the summing amplifiers (124), buffers, and latches in the data transport bank operating in the calibration mode (128) to determine whether the positive offset voltage of 50 mV has been cancelled.

In the event that the positive offset voltage of 50 mV has not been fully cancelled, the receiver (136) may decrease the countering voltage to −10 mV. Such a process may be iteratively repeated, and a previously applied counteracting voltage may be adjusted (316), until the positive offset voltage of 50 mV has been cancelled.

In the example method of FIG. 3, switching (206) the mode of each data transport bank (104, 128) includes altering (312) a value of a mode input signal for each data transport bank (104, 128). In the example method of FIG. 3, each data transport bank (104, 128) may receive a mode input signal that specifies an operational mode for the data transport bank (104, 128) that receives the signal. For example, a mode input signal with a value of 0 may indicate that the data transport bank (128) is to operate in the data transport mode while a mode input signal with a value of 1 may indicate that the data transport bank (128) is to operate in the calibration mode. In such example, such a mode input signal may also be passed to other hardware within the DFE (100) such as a local offset module (118 of FIG. 1), a tap feedback module (130 of FIG. 1), and a multiplexer (120 of FIG. 1) to ensure proper operation of the DFE (100). In the example method of FIG. 3, altering (312) a value of a mode input signal for each data transport bank (104, 128) may be carried out by changing a mode input signal with a value of 0 to 1 and changing a mode input signal with a value of 1 to 0. Altering (302) the value of a mode input signal that is provided to each data transport bank (104, 128) may be done for every data transport bank (104, 128). Readers will appreciate that by switching the mode of each data transport bank (104, 128) after a particular data transport bank (104, 128) has been calibrated, the DFE (100) is always utilizing a recently calibrated data transport bank (104, 128). As such, even if operating conditions change, the DFE (100) can still operate reliably.

Figure 4:
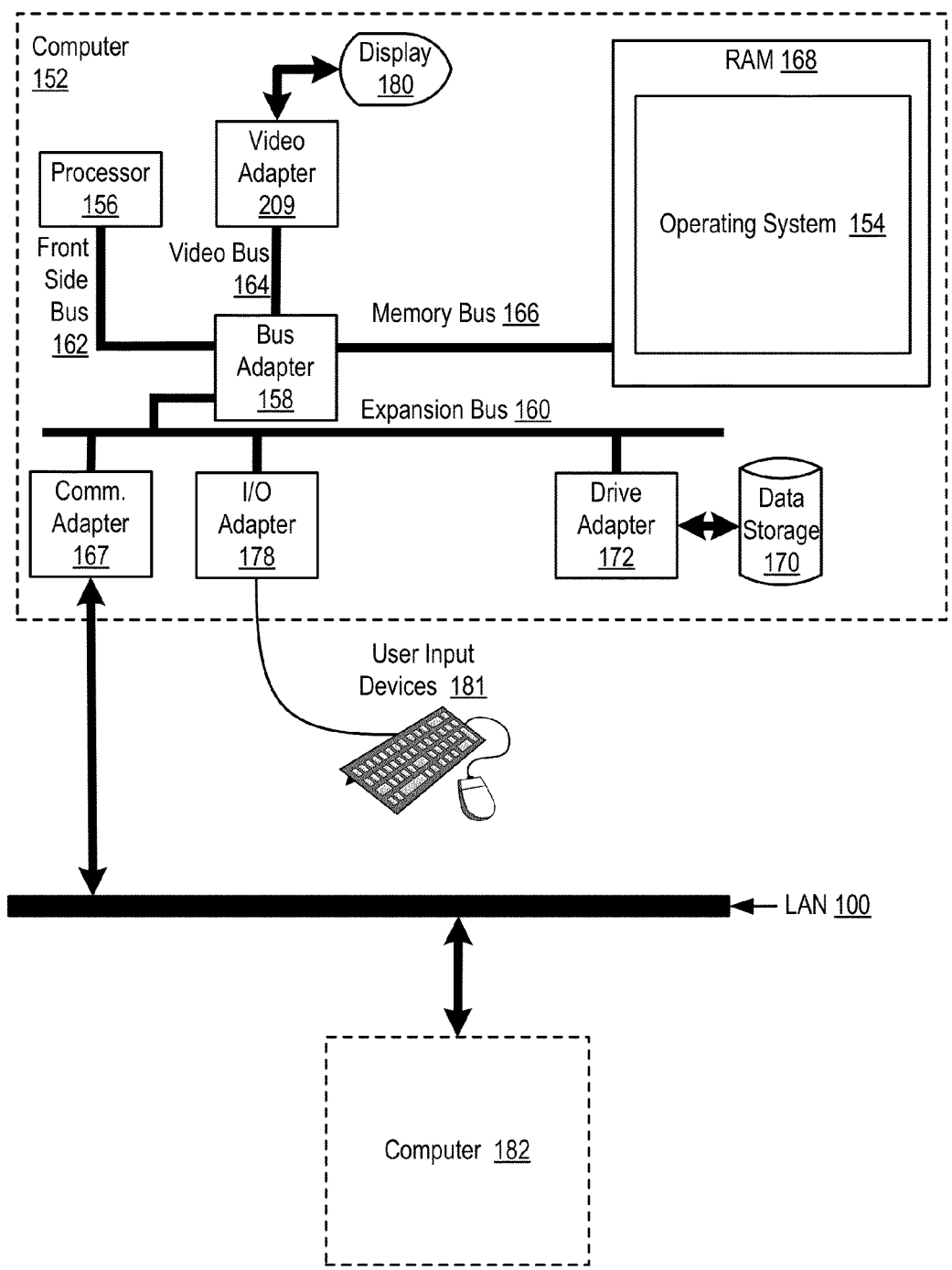
FIG. 4 sets forth a block diagram of automated computing machinery comprising an example computer useful in dynamically calibrating the offset of a receiver with a DFE while performing data transport operations.

For further explanation, FIG. 4 sets forth a block diagram of automated computing machinery comprising an example computer (152) useful in dynamically calibrating the offset of a receiver with a DFE while performing data transport operations. The computer (152) of FIG. 4 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an operating system (154). Operating systems useful in dynamically calibrating the offset of a receiver with a DFE while performing data transport operations include UNIX™, Linux™, Microsoft XP™, AIX™, IBM's i5/OS™, and others as will occur to those of skill in the art. The operating system (154) in the example of FIG. 4 is shown in RAM (168), but many components of such software typically are stored in non-volatile memory also, such as, for example, on a disk drive (170).

The computer (152) of FIG. 4 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for dynamically calibrating the offset of a receiver with a DFE while performing data transport operations include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 4 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 4 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 4 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically calibrating the offset of a receiver with a DFE while performing data transport operations include modems for wired dial-up communications, Ethernet (IEEE 802.3) adapters for wired data communications network communications, and 802.11 adapters for wireless data communications network communications.

Example embodiments are described largely in the context of a fully functional computer system for dynamically calibrating the offset of a receiver with a DFE while performing data transport operations. Readers of skill in the art will recognize, however, that aspects of dynamically calibrating the offset of a receiver with a DFE while performing data transport operations may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the methods described herein as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present application.

As will be appreciated by one skilled in the art, aspects described herein may be embodied as a system, method or computer program product. Accordingly, aspects of the described herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of embodiments is limited only by the language of the following claims.

What is claimed is:

1. A method of dynamically calibrating an offset of a receiver with a Decision Feedback Equalizer ('DFE') while performing data transport operations, the DFE comprising a plurality of independent data transport banks, at least one data transport bank operating a data transport mode and at least one data transport bank operating in a calibration mode, the method comprising:
   iteratively, while carrying out data transport operations:
      utilizing the data transport bank operating in the data transport mode to perform data transport operations;
      calibrating the data transport bank operating in the calibration mode; and
      switching the mode of each data transport bank upon completing calibration of the data transport bank operating in the calibration mode, wherein switching the mode of each data transport bank comprises switching the mode of the data transport bank operating in the calibration mode to the data transport mode and switching the mode of the data transport bank operating in the data transport mode to the calibration mode.

2. The method of claim 1 further comprising performing a global calibration during initialization of the receiver.

3. The method of claim 2 wherein performing a global calibration during initialization of the receiver further comprises:
   determining an amount of offset voltage introduced by one or more amplifiers that are not included in any data transport bank; and
   applying a counteracting voltage in dependence upon the amount of offset voltage introduced by the one or more amplifiers that are not included in any data transport bank.

4. The method of claim 1 wherein calibrating the data transport bank operating in the calibration mode further comprises:
   determining an amount of offset voltage introduced by one or more summing amplifiers, buffers, and latches in the data transport bank operating in the calibration mode; and
   applying a counteracting voltage in dependence upon the amount of offset voltage introduced by the one or more summing amplifiers, buffers, and latches in the data transport bank operating in the calibration mode.

5. The method of claim 1 wherein switching the mode of each data transport bank further comprises altering a value of a mode input signal for each data transport bank.

6. The method of claim 1 wherein each data transport bank includes a plurality of data transport paths.

7. Apparatus for dynamically calibrating an offset of a receiver with a Decision Feedback Equalizer ('DFE') while performing data transport operations, the DFE comprising a plurality of independent data transport banks, at least one data transport bank operating a data transport mode and at least one data transport bank operating in a calibration mode, the apparatus comprising a computer processor, a computer memory operatively coupled to the computer processor, the computer memory having disposed within it computer program instructions that, when executed, cause the apparatus to carry out the steps of:
   iteratively, while carrying out data transport operations:
      utilizing the data transport bank operating in the data transport mode to perform data transport operations;
      calibrating the data transport bank operating in the calibration mode; and
      switching the mode of each data transport bank upon completing calibration of the data transport bank operating in the calibration mode, wherein switching the mode of each data transport bank comprises switching the mode of the data transport bank operating in the calibration mode to the data transport mode and switching the mode of the data transport bank operating in the data transport mode to the calibration mode.

8. The apparatus of claim 7 further comprising computer program instructions that, when executed, cause the apparatus to carry out the step of performing a global calibration during initialization of the receiver.

9. The apparatus of claim 8 wherein performing a global calibration during initialization of the receiver further comprises:
   determining an amount of offset voltage introduced by one or more amplifiers that are not included in any data transport bank; and
   applying a counteracting voltage in dependence upon the amount of offset voltage introduced by the one or more amplifiers that are not included in any data transport bank.

10. The apparatus of claim 7 wherein calibrating the data transport bank operating in the calibration mode further comprises:
    determining an amount of offset voltage introduced by one or more summing amplifiers, buffers, and latches in the data transport bank operating in the calibration mode; and
    applying a counteracting voltage in dependence upon the amount of offset voltage introduced by the one or more summing amplifiers, buffers, and latches in the data transport bank operating in the calibration mode.

11. The apparatus of claim 7 wherein switching the mode of each data transport bank further comprises altering a value of a mode input signal for each data transport bank.

12. The apparatus of claim 7 wherein each data transport bank includes a plurality of data transport paths.

13. A non-transitory, computer readable storage medium for dynamically calibrating an offset of a receiver with a Decision Feedback Equalizer ('DFE') while performing data transport operations, the DFE comprising a plurality of independent data transport banks, at least one data transport bank operating a data transport mode and at least one data transport bank operating in a calibration mode, the non-transitory, computer readable storage medium storing computer program instructions that, when executed, cause a computer to carry out the steps of:
    iteratively, while carrying out data transport operations:
       utilizing the data transport bank operating in the data transport mode to perform data transport operations;
       calibrating the data transport bank operating in the calibration mode; and switching the mode of each data transport bank upon completing calibration of the data transport bank operating in the calibration mode, wherein switching the mode of each data transport bank comprises switching the mode of the data transport bank operating in the calibration mode to the data transport mode and switching the mode of the data transport bank operating in the data transport mode to the calibration mode.

14. The non-transitory, computer readable storage medium of claim 13 further comprising computer program instructions that, when executed, cause the computer to carry out the steps of performing a global calibration during initialization of the receiver.

15. The non-transitory, computer readable storage medium of claim 14 wherein performing a global calibration during initialization of the receiver further comprises:
   determining an amount of offset voltage introduced by one or more amplifiers that are not included in any data transport bank; and
   applying a counteracting voltage in dependence upon the amount of offset voltage introduced by the one or more amplifiers that are not included in any data transport bank.

16. The non-transitory, computer readable storage medium of claim 13 wherein calibrating the data transport bank operating in the calibration mode further comprises:
   determining an amount of offset voltage introduced by one or more summing amplifiers, buffers, and latches in the data transport bank operating in the calibration mode; and
   applying a counteracting voltage in dependence upon the amount of offset voltage introduced by the one or more summing amplifiers, buffers, and latches in the data transport bank operating in the calibration mode.

17. The non-transitory, computer readable storage medium of claim 13 wherein switching the mode of each data transport bank further comprises altering a value of a mode input signal for each data transport bank.

18. The non-transitory, computer readable storage medium of claim 13 wherein each data transport bank includes a plurality of data transport paths.

19. The non-transitory, computer readable storage medium of claim 13 wherein the non-transitory, computer readable medium comprises a recordable medium.

* * * * *